Nov. 30, 1948.  G. G. SCHNEIDER  2,455,317
TUBE SEALING MACHINE
Filed Aug. 3, 1945  7 Sheets-Sheet 1

INVENTOR.
Gerhard Gunther Schneider
BY

Nov. 30, 1948.  G. G. SCHNEIDER  2,455,317
TUBE SEALING MACHINE

Filed Aug. 3, 1945  7 Sheets-Sheet 2

INVENTOR.
Gerhard Gunther Schneider
BY

Nov. 30, 1948.    G. G. SCHNEIDER    2,455,317
TUBE SEALING MACHINE
Filed Aug. 3, 1945    7 Sheets-Sheet 3
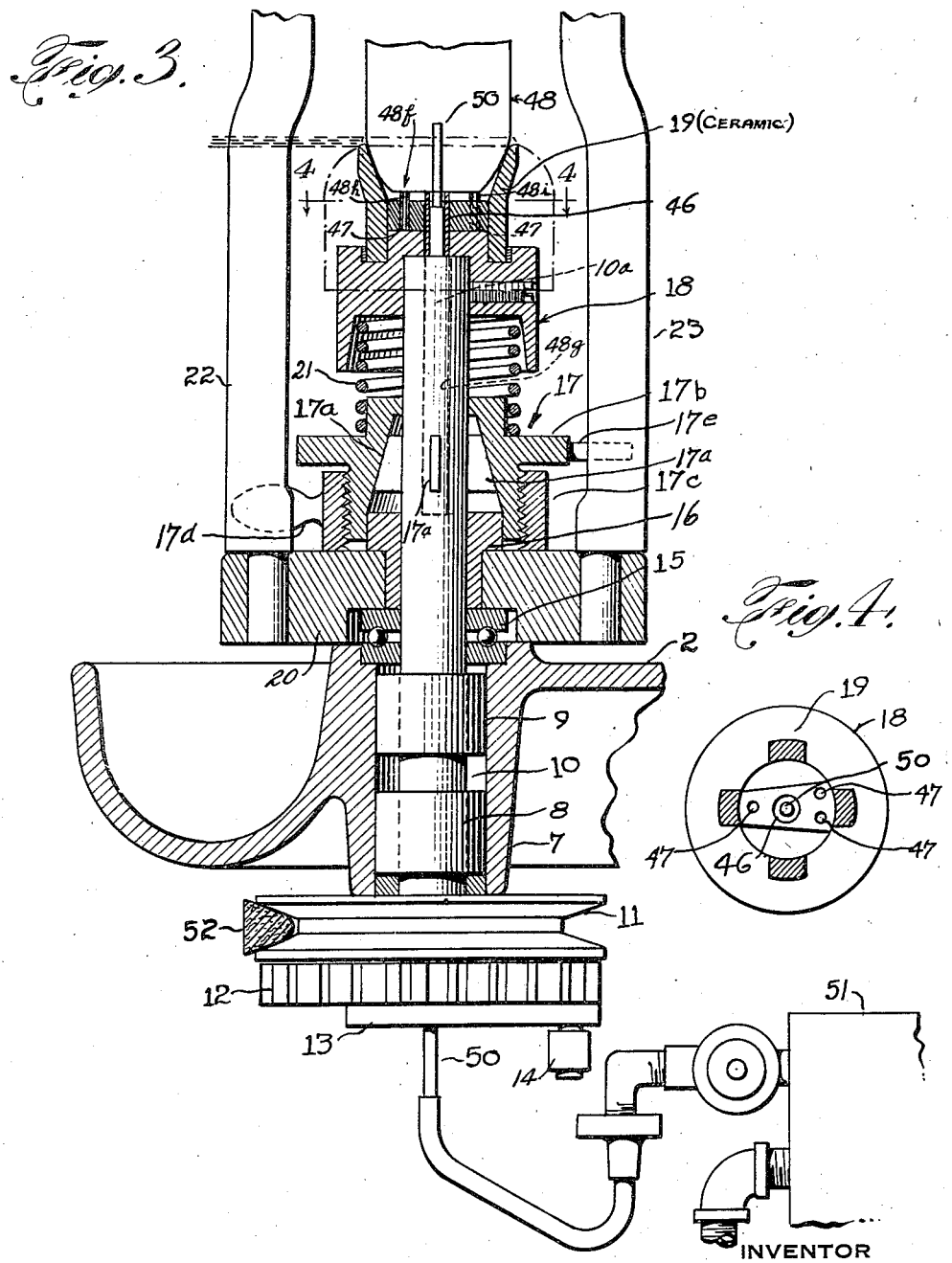
INVENTOR
Gerhard Gunther Schneider
BY
ATTORNEY Nov. 30, 1948.   G. G. SCHNEIDER   2,455,317
TUBE SEALING MACHINE
Filed Aug. 3, 1945   7 Sheets-Sheet 4
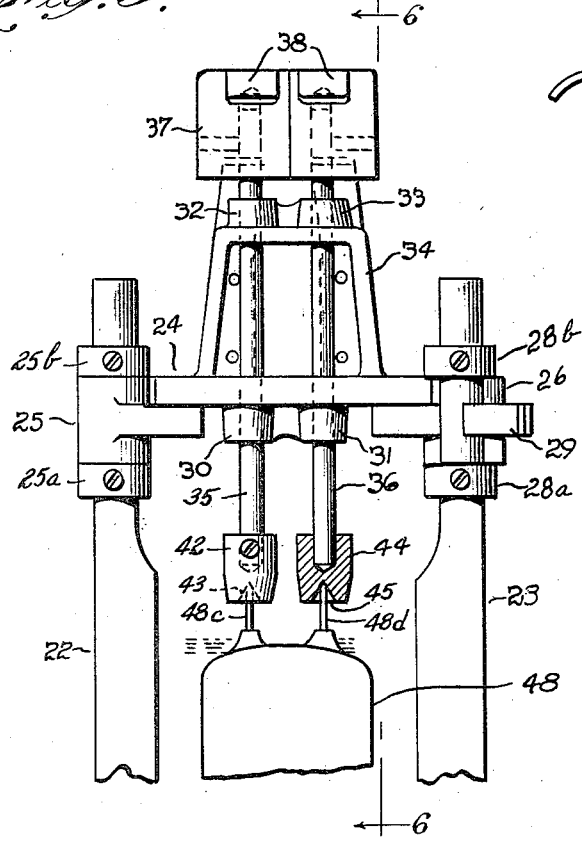
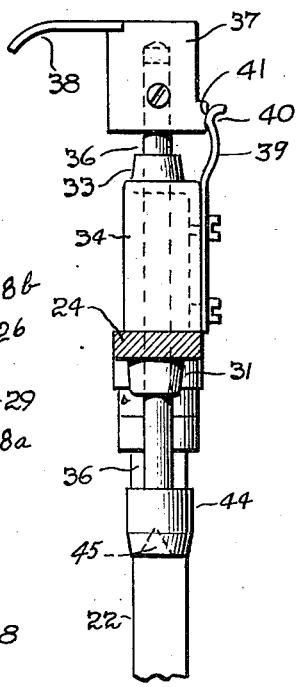
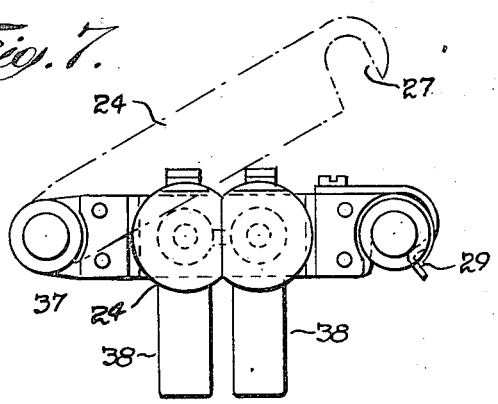
INVENTOR
Gerhard Gunther Schneider
BY
ATTORNEY Nov. 30, 1948.　　　G. G. SCHNEIDER　　　2,455,317
TUBE SEALING MACHINE
Filed Aug. 3, 1945　　　　　　　　　　　　　　　7 Sheets-Sheet 5

INVENTOR
Gerhard Gunther Schneider
BY
ATTORNEY

Nov. 30, 1948.  G. G. SCHNEIDER  2,455,317
TUBE SEALING MACHINE

Filed Aug. 3, 1945  7 Sheets-Sheet 6

INVENTOR
Gerhard Gunther Schneider
BY
J. F. Ebert
ATTORNEY

Nov. 30, 1948.  G. G. SCHNEIDER  2,455,317
TUBE SEALING MACHINE

Filed Aug. 3, 1945  7 Sheets-Sheet 7

INVENTOR
Gerhard Gunther Schneider
BY
ATTORNEY

Patented Nov. 30, 1948

2,455,317

UNITED STATES PATENT OFFICE 2,455,317

TUBE SEALING MACHINE

Gerhard G. Schneider, Maplewood, N. J., assignor to National Union Radio Corporation, Newark, N. J., a corporation of Delaware Application August 3, 1945, Serial No. 608,786

1 Claim. (Cl. 49—2)

The invention herein disclosed relates to a machine for sealing glass tubes. More particularly, the invention relates to a machine for effecting, simultaneously, a plurality of seals on a radio vacuum tube.

With certain types of radio tubes, contact pins extend through the top of the tube as well as through the bottom or base of the tube. In such cases, a glass cover must be sealed to the pins extending through the top of the tube as well as to the base of the tube. Heretofore, and prior to this invention, the sealing of such tubes was performed in several stages. The cover was sealed to the base and the pins in separate operations.

An object of this invention is to provide a machine that effects all necessary seals simultaneously. A further object of the invention is to provide a sealing machine of this kind in which sealed tubes are readily removed and tubes to be sealed readily inserted without stopping the machine. Another object of the invention is to provide a machine of this kind in which the contact pins are maintained in proper alignment and spaced relation during the sealing operation.

The foregoing objects and certain advantages that will hereinafter appear are realized in the embodiment of the invention illustrated in the accompanying drawing and described in detail below, from which description a clearer understanding of the invention may be had.

Figure 1:
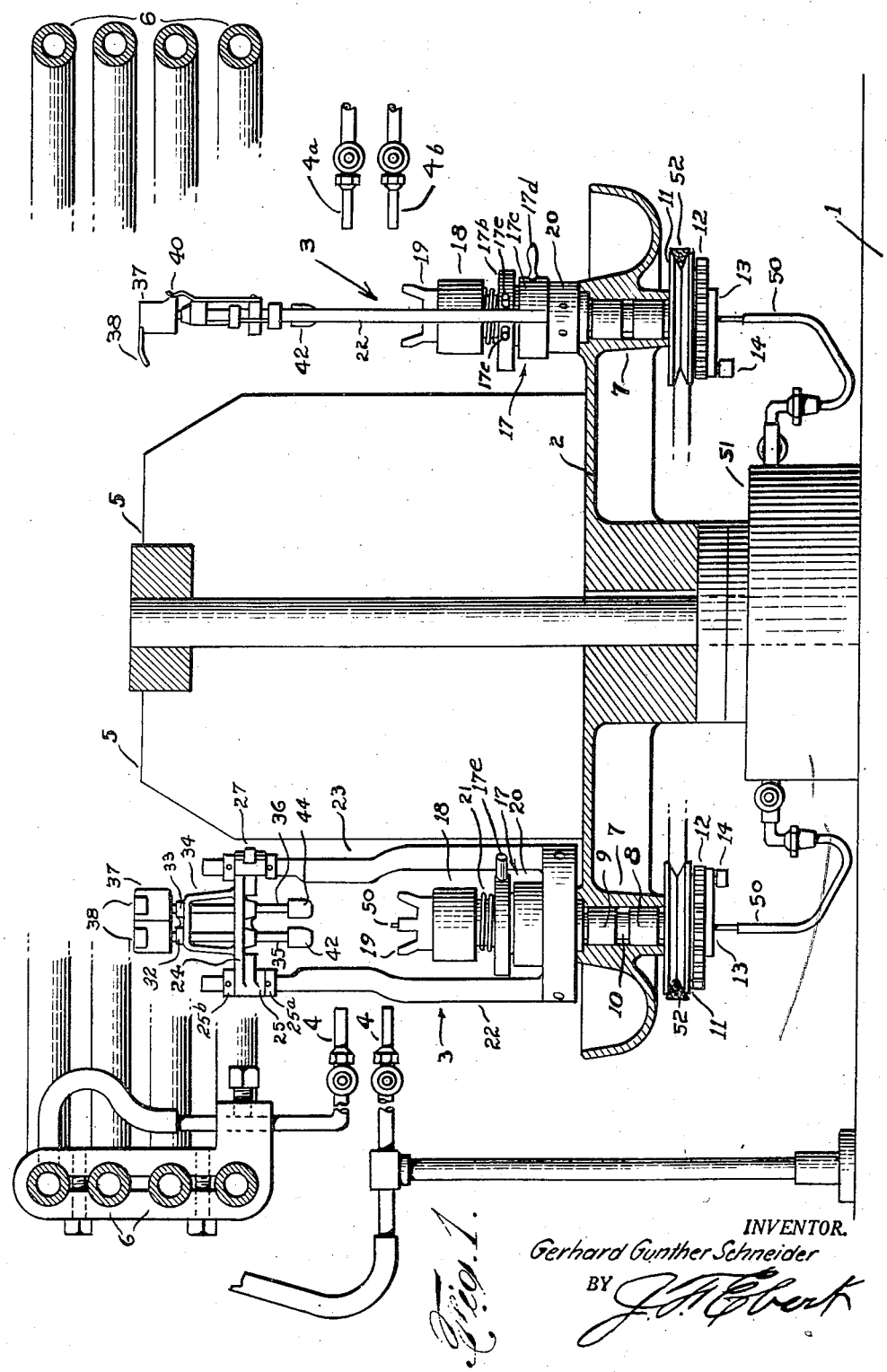
Figure 2:
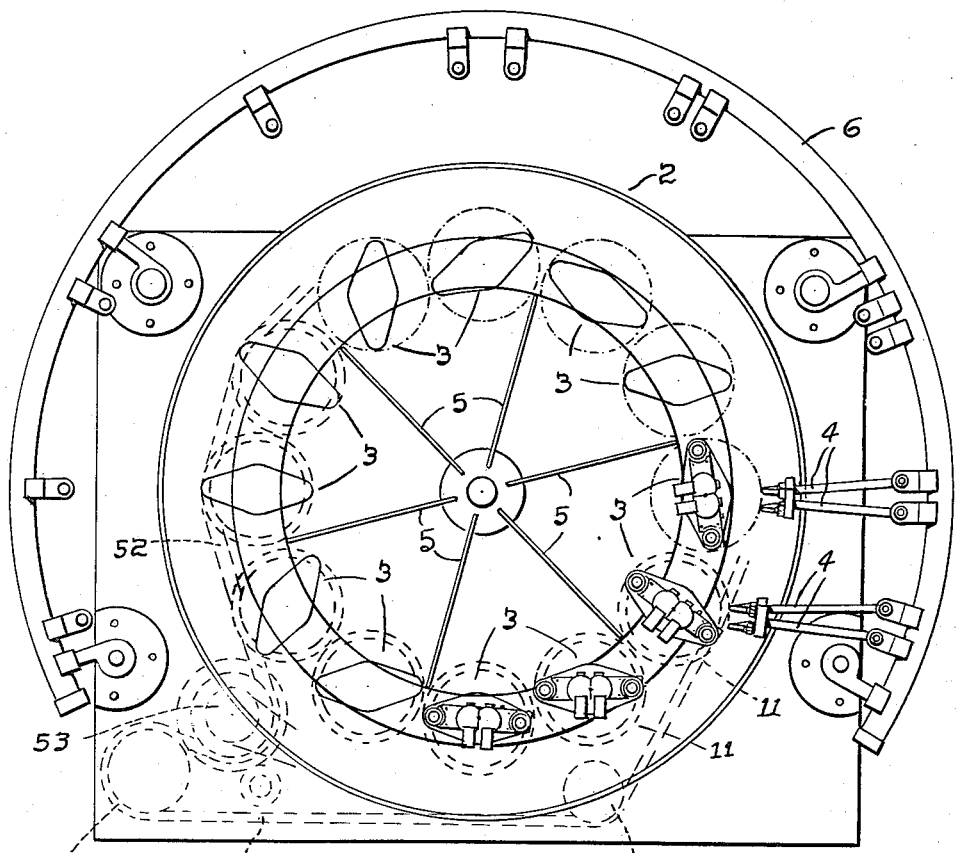
Figure 8:
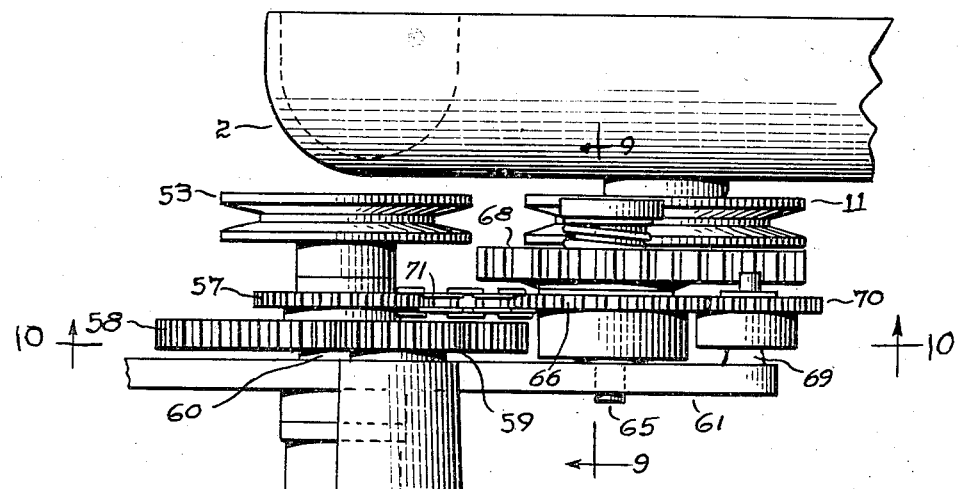
Figure 9:
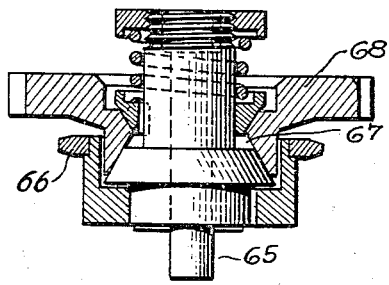
Figure 10:
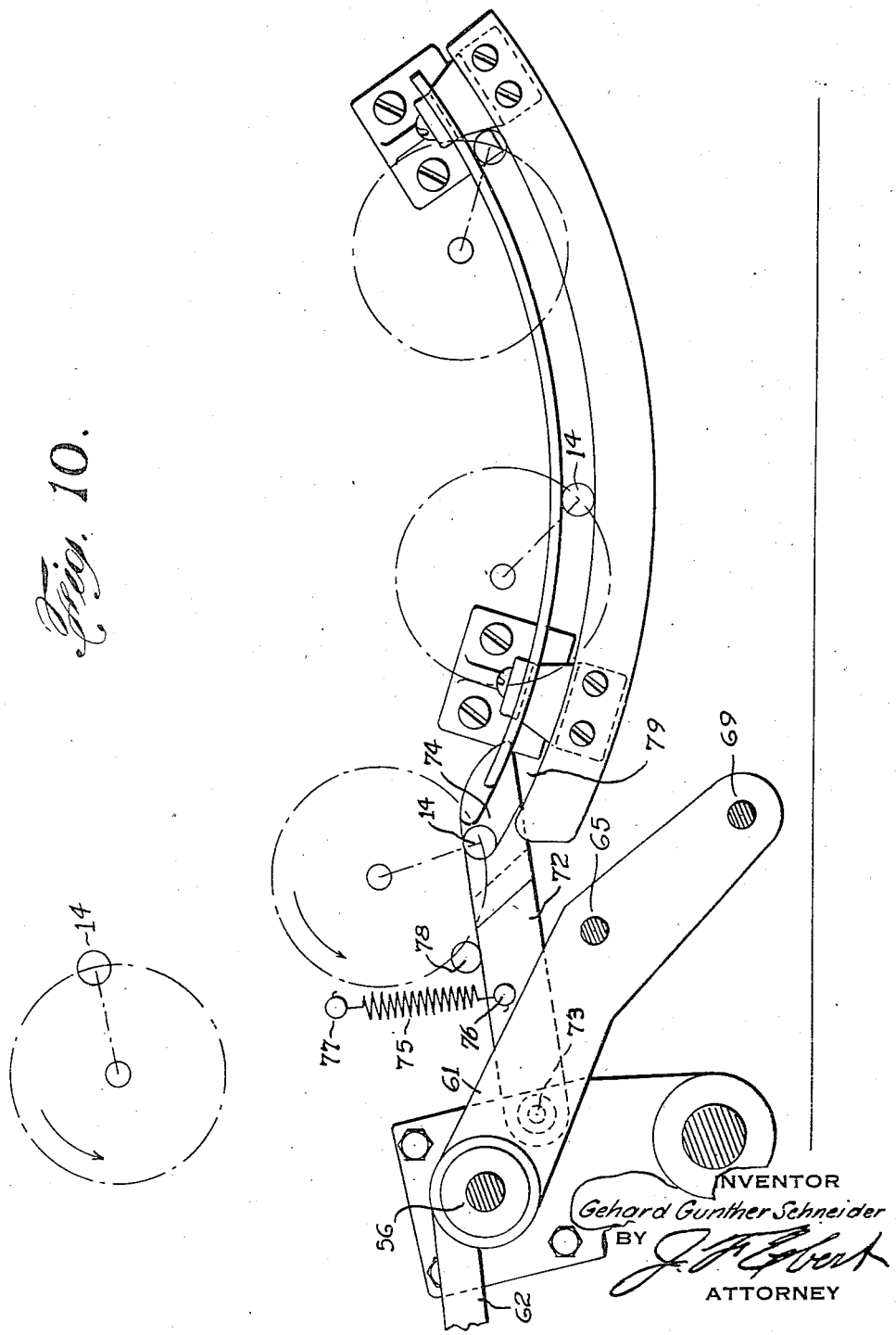
Figure 11:
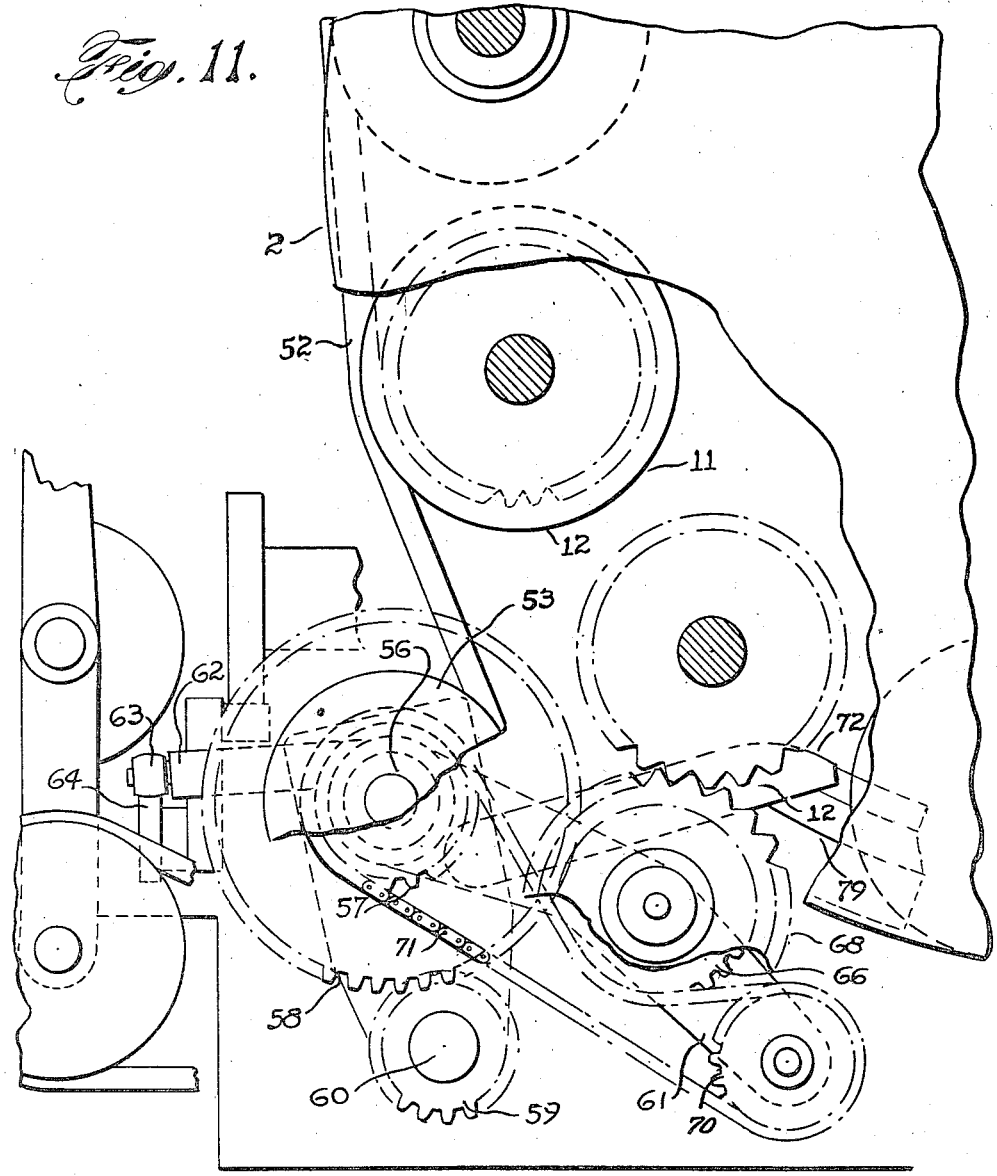

The drawings include:

Fig. 1 which is a sectional elevation of a machine embodying the invention;

Fig. 2 which is a plan of the same;

Fig. 3 which is a partial sectional elevation of a tube holder mounted in the table;

Fig. 4 which is a transverse section taken on the line 4—4 of Fig. 3;

Fig. 5 which is an elevation of the upper part of the tube holder;

Fig. 6 which is a side elevation of the same;

Fig. 7 which is a top plan of the same;

Fig. 8 which is a partial elevation showing the mechanism for positioning a tube holder;

Fig. 9 which is a sectional elevation of a slip clutch taken on the line 9—9 of Fig. 8;

Fig. 10 which is a partial sectional plan taken on the line 10—10 of Fig. 8; and Fig. 11 which is a partial plan taken on the line 11—11 of Fig. 9.

Figure 12:
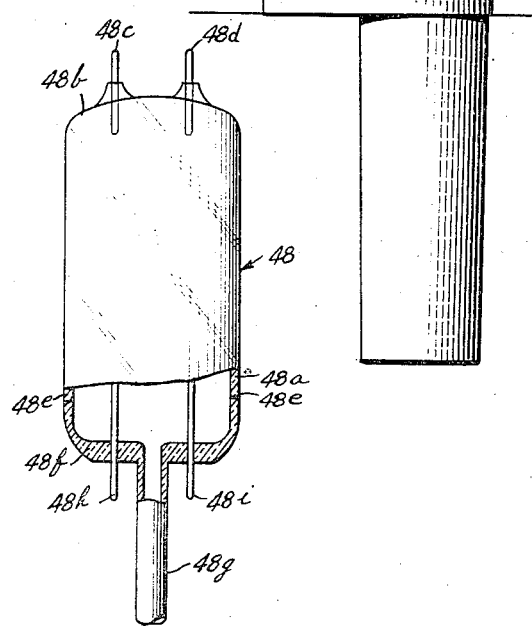

Fig. 12 is a view of a typical radio tube to be sealed according to the invention.

The machine illustrated in the drawings includes a frame having a base 1 that is elevated above the floor and beneath which an electric motor (not shown) is used to provide the driving power. On the base 1, there is mounted a table 2 for rotation about a vertical axis. This table is driven through mechanism (not shown) of a kind well known in the art in a step by step motion to index tube holders designated generally by the numeral 3 to several positions about the axis of the table and holds, for a predetermined time, the tube holders in each successive position. In certain of these positions there are a pair of vertically spaced jets 4a, 4b (only two pair of which are shown in Fig. 2) which direct flames on to the tube to effect the seals and cut off the excess skirt on the tube. There are twelve tube holders 3 mounted on the table. Six fire resistant partitions 5 extend toward the tube holders and act to confine the flame from the jets. The jets are supplied from a manifold 6. In this way, proceeding in successive stages over a partial revolution of the table, the glass is sealed, tempered and excess glass cut from the tube.

The tube holders are rotatably mounted on the table and during the sealing, tempering and cutting stages or steps, these tube holders are rotated. On leaving the last stage, proceeding in a counter-clockwise direction as seen in Fig. 2, each tube holder is brought to a particular position and maintained in that position during a partial revolution of the table. During these steps, a sealed tube is removed from the tube holder and a tube to be sealed is inserted in the tube holder.

At the position of each tube holder (Figs. 1 and 3), the table is provided with a boss 7 having spaced bearing bushings 8 and 9 therein and through which a vertical shaft 10 extends for rotation therein. On the lower end of the shaft 10 there is secured a pulley 11, a gear 12 and a crank arm 13 having a depending pin or cam follower 14. The shaft 10 extends through a thrust bearing 15, a bushing 16 and a tubulation clamping arrangement designated generally by the numeral 17. On the upper end of the shaft there is secured a fixture 18 on which there is mounted a fire-resistant, ceramic tube-receptacle 19. The bushing 16 is fixed to the shaft 10 and a base 20 of the tube holder. The base 20 thus rotates with the shaft. Fig. 12 shows a typical form of radio tube 48, comprising a glass bulb 48a, the upper end of which is closed by the dome portion 48b, and through which are sealed the top lead-in wires or contact pins 48c, 48d. The bulb 48a is to be sealed at its lower lip end 48e through the corresponding rim of a glass base member 48f. The base member 48f carries the usual downwardly extending glass exhaust tubulation 48g, and rigidly sealed into and through the base 48*f* are lead-in wires or contact pins 48*h*, 48*i*. The contact pins can be arranged in any suitable array around the center of the base 48*f*. Preferably, there are three such pins which are arranged to fit within correspondingly located openings in a portion of the tube holder to be described. It will be understood of course, that any well-known radio tube electrode assembly (not shown) is mounted within the tube 48 and the electrodes thereof are respectively connected to the various lead-in wires.

The shaft 10 is hollow and the tubulation 48*g*, that is the tubular extension from the base of a radio tube, is received in the shaft when the base of the tube rests in the tube-receptable 19. This tubular extension is clamped by the tubulation clamping arrangement 17. The clamping arrangement includes four clamping jaws 17ª which extend through radial slots in the shaft 10 spaced ninety degrees apart. The external edge of each clamping jaw is tapered or wedge-shaped as shown (Fig. 3). A housing 17ᵇ, having an inner conical recess complementary to the tapered edges of the clamping jaws 17ª, surrounds the clamping jaws. A compression spring 21 confined between the fixture 18 and the housing 17ᵇ functions to move the housing downwardly and so, by virtue of the relation of the conical recess and tapered edges of the clamping jaws, move the clamping jaws inwardly into clamping position.

The movement of the housing 17ᵇ is limited by a collar 17ᶜ which is in threaded engagement with the housing and which engages the base 20. Through the collar 17ᶜ, the clamping jaws may be relieved by the operator when inserting a tube to be sealed or removing a sealed tube and for this purpose it is provided with a finger piece 17ᵈ by means of which it may be rotated. The housing 17ᵇ is prevented from rotating with the collar. A pair of standards 22 and 23 extend upwardly from the base 20 and pins 17ᵉ (Figs. 1 and 3) extending radially from the housing embrace the standard 23. Thus as the collar 17ᶜ is rotated, in one direction, it raises, by virtue of the threaded engagement, and its abutment with the base, the housing 17ᵇ against the action of the spring 21. And, when moved in the opposite direction, the housing moves downwardly to move the clamping jaws inwardly.

At their upper ends, the standards 22 and 23 support a cross bar 24 (Figs. 1, 5, 6 and 7). One end of the cross bar is secured to a bracket 25 that is pivoted on the standard 22 between fixed collars 25ª and 25ᵇ. The opposite end of the cross bar is secured to a comparable bracket 26 having part of the hub removed to provide a slot 27 that engages the standard 23 between fixed collars 28*a*, 28*b*. A releasable spring latch 29 secures the cross bar to the standard 23.

Bosses 30 and 31 on the cross bar and aligned bosses 32 and 33 on a bracket 34 formed on the cross bar constitute spaced bushings for slidably mounted rods 35 and 36. At their upper ends the rods 35 and 36 are secured in a fixture 37 which has finger pieces 38 extending laterally therefrom. A leaf spring 39 secured on the bracket 34 has a detent 40 thereon which in the elevated position of the rods engages in a recess 41 in the fixture 37 and retains the rods in the elevated position. To the lower end of the rod 35, there is secured a block 42 which has a pin centering recess 43 in the end thereof. A like block 44 having a pin centering recess 45 therein is secured to the lower end of the rod 36.

Through the bottom of the tube receptable 19 (Figs. 3 and 4) there is a central opening 46 which receives the hollow glass rod 48*g* on the base of the vacuum tube 48. Also, through the base of the tube receptacle, there are pin receiving openings 47 to receive the wires or pins 48*h*, 48*i*. These openings 47 serve to orient the tube 48 placed in the receptacle, so that the pins 48*c*, 48*d* extending through the top of the tube are positioned to be received in the aligning recesses of the blocks 42 and 44. Thus, by inserting the tube with its pins 48*h*, 48*i* in the appropriate openings 47 in the tube holder, the radio tube 48 is automatically oriented so that the top pins 48*c*, 48*d* are aligned with the centering recesses in members 42 and 44. The shaft 10 is hollow and a tube or conduit 50 extends through the shaft and into the tube receptacle. When a tube is placed in the tube holder, the rods 35 and 36 are raised and the cross bar swung about its pivot. The radio tube is inserted so that the tube or conduit 50 which forms part of the machine and extends into the radio tube, and so that pins 48*h*, 48*i* on the radio tube base extend into the openings 47. The cross bar 24 is then latched in position and the rods are let down so that the pins are received in the aligning recesses of the blocks 42 and 44. The radio tube is now ready to proceed through the sealing stages. The conduit 50 is connected to a source of inert gas represented as a chamber 51 (Fig. 3). While the tube is being sealed, inert gas is continually fed to the interior of the tube.

Through the pulleys 11 the tube holders are rotated during a partial revolution of the table. For this purpose, a belt 52 is arranged to engage the pulley of a tube holder at those positions in which operations are performed on the tube. The belt 52 (Fig. 2) is a continuous belt. It passes from a drive pulley 53 about an idler pulley 54. From the idler 54, the belt 52 passes, spaced from the pulleys 11, to another idler 55. The belt then extends substantially tangential to a circle containing the outer, belt engaging peripheries of the pulleys 11 so that as a pulley 11 comes to the stage at the first flame jets, proceeding counter-clockwise as seen in Fig. 2, the pulley 11 is engaged and the tube holder is rotated. The pulley 11 remains engaged and the tube holder rotated until it approaches the drive pulley 53.

The drive pulley 53 (Figs. 8 and 11) is mounted on a shaft 56. Also mounted on this shaft, there are a sprocket 57 and a gear 58. The gear 58 meshes with a drive pinion 59 that is mounted on a drive shaft 60. The shaft 60 extends below the base 1 and is driven by an electric motor (not shown).

When the pulley 11 of a tube holder, as it approaches the drive pulley 53, becomes disengaged from the belt 52 (Figs. 10 and 11), the tube holder is brought to a particular position, a position in which the finger pieces 38 extend outwardly, and it is held in that position while it passes between the drive pulley and the idler 55. This positioning of the tube holder is effected through the cam follower or pin 14 cooperating with positioning mechanism. The positioning mechanism is mounted on a bracket 61 (Figs. 8, 9, 10 and 11) that is pivoted on the shaft 56. The bracket 61 has an arm 62 extending therefrom and carrying a cam follower 63 that engages a cam 64 for a purpose hereinafter disclosed.

On the bracket 61 there is secured a shaft 65 on which there is rotatably mounted a sprocket 66. Through an adjustable, friction, slip clutch, designated by the numeral 67, the sprocket is connected to a gear 68. Another shaft 69, extending from the bracket 61, rotatably supports an idler sprocket 70. A continuous link chain 71 passes around the drive sprocket 57 and the idler sprocket 70 and engages the sprocket 66. Through the sprocket 66 and the friction clutch 67 the gear 68 is driven.

As a tube holder leaves contact with the belt 52, the cam 64 acts upon the cam follower 63 to move the bracket 61 so that the gear 68 engages the gear 12 on the tube holder. The tube holder is then rotated through the gear 68 until the pin 14 thereon is captured and led into a fixed channel. For capturing the pin 14, there is provided a lever 72 (Fig. 10). This lever is pivotally mounted at one end on a pivot 73 secured in the bracket 61. At the other end the lever is provided with a pin receiving and guiding slot 74. A spring 75 secured at one end to a pin 76 on the lever 72 and at the other end to a pin 77 fixed to an immovable part of the machine frame tends to resiliently hold the lever against a stop pin 78 and in the path of a pin 14 on a tube holder positioned to be rotated by the gear 68. As a pin 14 engages the lever, the lever moves against the action of the spring until the pin 14 enters the slot 74. The pin is thus captured and the clutch 67 may slip until the bracket 61 is moved by the cam 64 to disengage the gears 68 and 12.

The lever 72 is arranged in a telescopic fit with the end of an arcuate channel 79 secured to the base 1 and constituting a cam groove for the pin 14. As the table indexes, the pin 14 moves into the channel, and while therein retains the tube holder in the position to which it was brought by the positioning mechanism. While the tube holder is so positioned, the operator may remove the tube that has been sealed and insert a tube to be sealed.

It will be obvious that various changes may be made by those skilled in the art in the details of the embodiment of the invention illustrated in the drawing and described in detail above within the principle and scope of the invention as expressed in the appended claim.

I claim:

A sealing device for electron tubes of the type having a plurality of contact wires extending from the lower end and a plurality of contact wires extending from the upper end but laterally spaced from the longitudinal central axis of the tube, said device comprising, a holder for the tube said holder having a plurality of recesses to receive the lower end wires and a plurality of spaced but vertically shiftable members to register with and locate the said upper end wires, means to rotate said holder and said tube as a unit, a sealing torch for sealing the lower end of the tube, a sealing torch for simultaneously sealing the upper end of the tube while maintaining the tube in rotation, said shiftable members serving to maintain the original assembled orientation of the lower end wires with respect to the upper wires during the entire sealing and rotation of the tube.

GERHARD G. SCHNEIDER.

REFERENCES CITED

The following references are of record in the file of this patent:

UNITED STATES PATENTS

| Number | Name | Date |
| --- | --- | --- |
| 1,569,185 | Higgins | Jan. 12, 1926 |
| 1,742,153 | Stiles et al. | Dec. 31, 1929 |
| 2,023,628 | Van Sant | Dec. 10, 1935 |
| 2,063,235 | Eisler | Dec. 8, 1936 |
| 2,079,893 | Bain et al. | May 11, 1937 |
| 2,162,209 | Trutner | June 13, 1939 |
| 2,185,704 | Donovan et al. | Jan. 2, 1940 |
| 2,267,598 | Thomas | Dec. 23, 1941 |
| 2,322,728 | Gates | June 22, 1943 |
| 2,334,001 | Hapgood | Nov. 9, 1943 |
| 2,376,540 | Iden | May 22, 1945 |